INVENTORS
JOHN D. GAYER
EMIL J. HANK

ATTORNEY

April 30, 1963  E. J. HANK ETAL  3,087,187
AUTOMATED LEAF COLLECTOR
Filed Oct. 31, 1960  2 Sheets-Sheet 2

INVENTORS
JOHN D. GAYER
EMIL J. HANK
BY
Charles D. Putnam
ATTORNEY

United States Patent Office 3,087,187
Patented Apr. 30, 1963

3,087,187
AUTOMATED LEAF COLLECTOR
Emil J. Hank, Minerva, and John D. Gayer, Alliance, Ohio, assignors to Good Roads Machinery Corporation, Minerva, Ohio, a corporation of Ohio
Filed Oct. 31, 1960, Ser. No. 66,271
10 Claims. (Cl. 15—340)

Our invention relates to a leaf and debris collecting machine and more particularly to the type that picks up the leaves off of the street and deposits them into the body of a truck for transportation to the dumping area.

In cities, the leaves falling from trees in parks and residential areas will accumulate in the street. Upon the occurrence of a heavy rain, the leaves will be washed from the streets into the catch basins and storm sewers where they will block the normal flow of water. The rain water backs up to flood the basements of surrounding homes and the streets. As is understandable, these conditions are very disastrous. Also, it is very time consuming and expensive to remove the leaves blocking the catch basins and storm sewers. Therefore, it is the practice of cities to pick up the leaves off of the streets before they have accumulated in quantities sufficient to block the catch basins and storm sewers, should a rain occur.

Heretofore, leaf collecting machines were of the type that utilized a partial vacuum created by a fan to pick up the leaves. The partial vacuum was communicated to the ground by means of a hose. The end of the hose was passed over the ground surface so the leaves and debris thereon would be drawn into the hose. It is readily seen that this method required a man for operating the hose over the ground surface and that the area capable of being covered in this manner for a given time is extremely small.

When the leaves are wet or packed due to the normal traffic on the street, it is necessary that the leaves be agitated or loosened so they could be picked up. In these prior machines this agitation or loosening of the leaves had to be done manually.

Because of the "bulk" formed by a load of leaves in comparison to their weight, it is desirous to mulch the leaves before depositing them in the truck body. When the leaves are mulched, a much greater quantity can be loaded into a truck. Some of the prior machines did mulch the leaves by passing them through the fan before they were deposited in the truck. This method has not proven satisfactory because, the fan had to operate at high speeds to create the partial vacuum necessary to pick up the leaves. When the leaves are passed through the fan, the foreign matter mixed with the leaves, such as stones, tin cans and sticks, will strike the fan and cause considerable damage to it. This necessitated the frequent repair of the fan and oftentimes, its replacement.

Further, when the leaves are mulched by the fan, there is no known practical method by which the dust and dirt picked up with the leaves may be removed from the air stream before it is exhausted to atmosphere. The objection to the dust and dirt laden air is obvious when considered that these machines must operate in business and residential areas of cities.

Also, in prior leaf machines, the fan, its power driving means and any dust arresting means were made an integral part of the truck. Thus, when the truck was full, all use of the collecting machinery had to be stopped, since it went with the truck to the dumping area. This required a number of expensive trucks for use solely as leaf collectors.

Our invention utilizes a trailer having mounted therein a fan, a mulcher, a dust arresting means and the power means for driving the fan and mulcher. The trailer is adapted to be towed by a truck having an enclosed housing thereon. The housing is connected to the fan whereby air is withdrawn from the housing to create a partial vacuum therein. The housing is also connected to the mulcher so the mulched leaves are drawn into and deposited in the housing. The dust arresting means is connected at the exhaust side of the fan so the dirt and dust suspended in the air stream can be removed therefrom before it is exhausted to atmosphere.

The mulcher consists of a horizontal rotating shaft having chains spaced along its length and around its circumference. A knife blade is attached to the end of each chain. As the shaft rotates, the knife blades are thrown outward therefrom by the centrifugal force.

The mulcher is supported above the ground so the knife blades, in their outward position, will be maintained away from the ground surface. As the mulcher moves over the leaves, the knife blades cut down into the leaves. The cutting down into the leaves also agitates and loosens them to facilitate their being picked up. The agitating of the leaves shakes any stones or dirt thereon to the ground so it will not be picked up with the leaves.

The chain connection of the knife blades to the rotating shaft makes them flexible in the sense that they will not break should they strike a solid object, such as a large rock or curb.

The knife blades throw the cut portion of the leaves up into the housing that connects the mulcher to the truck housing. Thereafter, the leaves are drawn into the truck housing by the partial vacuum.

The air withdrawn from the truck housing by the fan is mixed with water. The air is then exhausted through a series of baffles, which removes the water and dirt, so only clean air is exhausted to atmosphere.

A quick detaching and attaching means is provided on the trailer and truck so they may be connected in the minimum of time. Additional means is provided on the trailer so that the mulcher is supported from the ground completely independent of whether the truck is empty or loaded.

Other means are also provided for supporting the connections to the truck so they may be readily attached and detached therefrom. The secureness of the connection between the truck housing and the hose is assisted by the partial vacuum created.

Further, means are provided at each side of the truck so the trailer can be connected to allow picking up of leaves on either the right hand or left hand side of the truck.

It is therefore the primary object of our invention to provide a leaf collecting machine that will accomplish the above.

It is a further object of our invention to provide a leaf collecting machine with mulching action.

It is a still further object of our invention to provide a leaf collecting machine that will pick up the leaves on the street and leave the other debris, such as stones, tin cans, etc.

It is another object of our invention to provide a leaf collecting machine that can readily be attached to and detached from a truck having a housing thereon for transporting the leaves.

It is still another object of our invention to provide a leaf collecting machine that can pick up a large width of the street without requiring prior manual withdrawing or agitation.

The above and other objects of our invention will be made apparent to those skilled in the art, when taken into consideration with the following specifications and the accompanying drawings in which.

Figure 1:
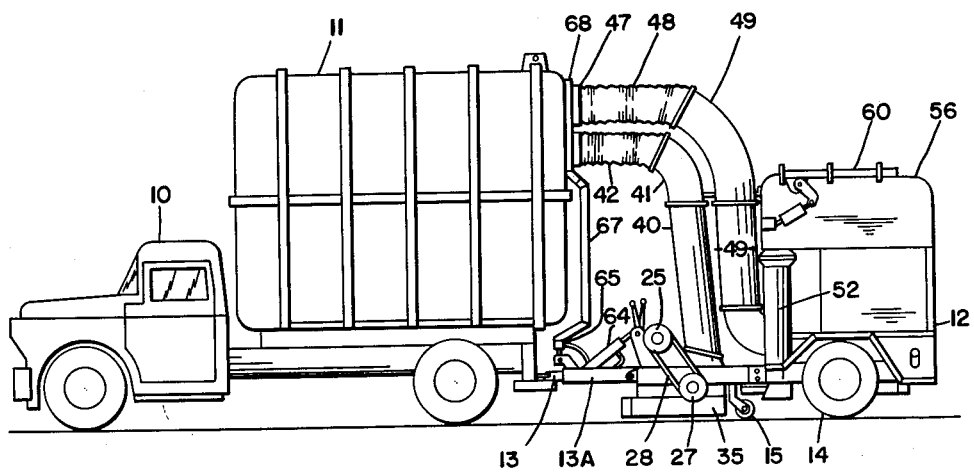
FIGURE 1 is a side view of the truck and the trailer.

With reference to the drawings, there is shown in FIGURE 1 a truck 10 having an enclosed housing 11 mounted at its rear. A trailer 12 is adapted to be towed behind truck 10 by a hitch 13 on a tongue 13A which connects at the rear of truck 10. Trailer 12 is supported above the ground by a pair of wheels 14 and a pair of adjustable casters 15.

Housing 11 is completely enclosed so a partial vacuum can be created therein. Body 11 is divided into two chambers, a large lower chamber 16 and a smaller upper chamber 17 (see FIGURE 3). Chambers 16 and 17 are separated by a screen 18 which extends the full length and width of housing 11.

Chamber 16 has an opening 19A at the left rear of housing 11 and a second opening 19B (not shown) at the right rear of housing 11. Openings 19A and 19B are located immediately below screen 18.

Chamber 17 has an opening 20A thereto at the top left rear of housing 11 and an opening 20B at the top right rear of housing 11.

Openings 19A and 20A, and 19B and 20B are in vertical alignment, respectively.

Openings 19A and 20A are used when trailer 12 is towed along the left side of truck 10 and openings 19B and 20B are utilized when trailer 12 is towed at the right side of truck 10. The openings not connected for use are closed by means not shown.

A motor 21 is mounted at the rear of trailer 12 and has a drive shaft 22 extending forward thereof. Mounted on shaft 22 for rotation therewith is a fan 23.

The forward end of drive shaft 22 extending beyond fan 23 connects to a gear box 24. Gear box 24 has an output shaft 26 with a pulley 25 mounted thereon for driving a pulley 27 by a belt 28.

Pulley 27 is mounted on a drive shaft 29 which drives the mulcher. The mulcher is of substantial length and consists of a drum 30, see FIGURE 3, having a plurality of chains 31 depending therefrom spaced around its circumference and along its length. Each chain 31 has a knife blade 32 fastened to its outer end. The inner end of each chain 31 is connected to drum 30 by means not shown.

When drum 30 is not rotating, chains 31 will be slack and drop downward due to gravity. When drum 30 is rotating, the chains 31 and knife blades 32 will be fully extended outward due to centrifugal force.

The mulcher is enclosed in an open bottom housing 33 that extends the full length of drum 30 and having end members 34 and 35. Housing 33 is of sufficient size to allow chains 31 and knife blades 32 to rotate while fully extended and is positioned under the front of trailer 12. Attached at the bottom rear edge of housing 33 is a flexible rubber squeegee 36 which is maintained in engagement with the surface of the street.

The height that the mulcher is maintained from the ground is varied depending upon the quantity and condition of the leaves on the street. This distance is varied by casters 15 which are made adjustable.

A pair of fixed rollers 37A (not shown) and 37B are attached on either side to trailer 12 immediately behind housing 33. The purpose of these rollers is to prevent the mulcher from being lowered until knife blades 32 engage the surface of the street. Rollers 37A and 37B also prevent knife blades 32 from striking the street should the crown of the street be too great, or should a caster fall in a hole or depression. Rollers 37A and 37B are of substantial length to ride over any depression in or crown on the street.

The front side of housing 33 has an opening along its length so the mulcher can be drawn over the leaves in the street. A forward extending member 38 from housing 33 serves to slightly compress the leaves as the opening of the mulcher moves over them.

Housing 33 has another opening 39 along its length at its top which opens into housing 40. Housing 40 is generally in the shape of an inverted truncated triangle. The truncated top of housing 40 is connected by an elbow section 41 and a flexible hose 42 to a connection means 43 on a plate 44 having an opening 45 therein to mate with opening 19A or 19B in chamber 16.

Connection plate 44 has a second opening 46 therein spaced above opening 45 to mate with opening 20A or 20B. (see FIGURE 4). A connection means 47 surrounds opening 46 and is connected by a flexible hose 48 to a housing 49.

Housing 49 has at its bottom rear an opening 50 which opens into a chamber 51 containing fan 23. Fan 23 and chamber 51 is enclosed by a housing 52 having an upward opening 53 with a deflector plate 54 at an angle above it. This opens into a chamber 55 enclosed by housing 56.

Housing 56 is formed to have an open top tank 57 therein for holding water. Positioned immediately above the water are baffles 58. Above baffles 58 is an opening 59 covered by a screen 60.

A water pipe 61 has one end 62 under the water in tank 57 and the other end 63 connected in housing 49 immediately before opening 50.

To operate the leaf collector, motor 21 is started and fan 23 rotates by means of drive shaft 22.

As fan 23 rotates, it creates a partial vacuum in housing 11. Air is drawn in through the front and bottom opening of housing 33 of the mulcher and through housing 40, elbow 41, flexible hose 42, opening 19A, into chamber 16. The air is then drawn up through screen 18 into chamber 17 and out through opening 20A, flexible hose 48, housing 49 and opening 50 into housing 52 of fan 23. From fan 23 the air is exhausted upward through opening 53 and is deflected by plate 54, baffles 58 and out through screen 60 to atmosphere. This air flow path is shown by the arrows in FIGURE 3.

With motor 21 turning drive shaft 22, gear box 24 rotates drive shaft 26 to rotate drive shaft 29 through pulley 25, belt 28 and pulley 27. This causes drum 30 of the mulcher to rotate at a high speed and the plurality of chains 31 and knife blades 32 become extended due to the centrifugal force.

Figure 3:
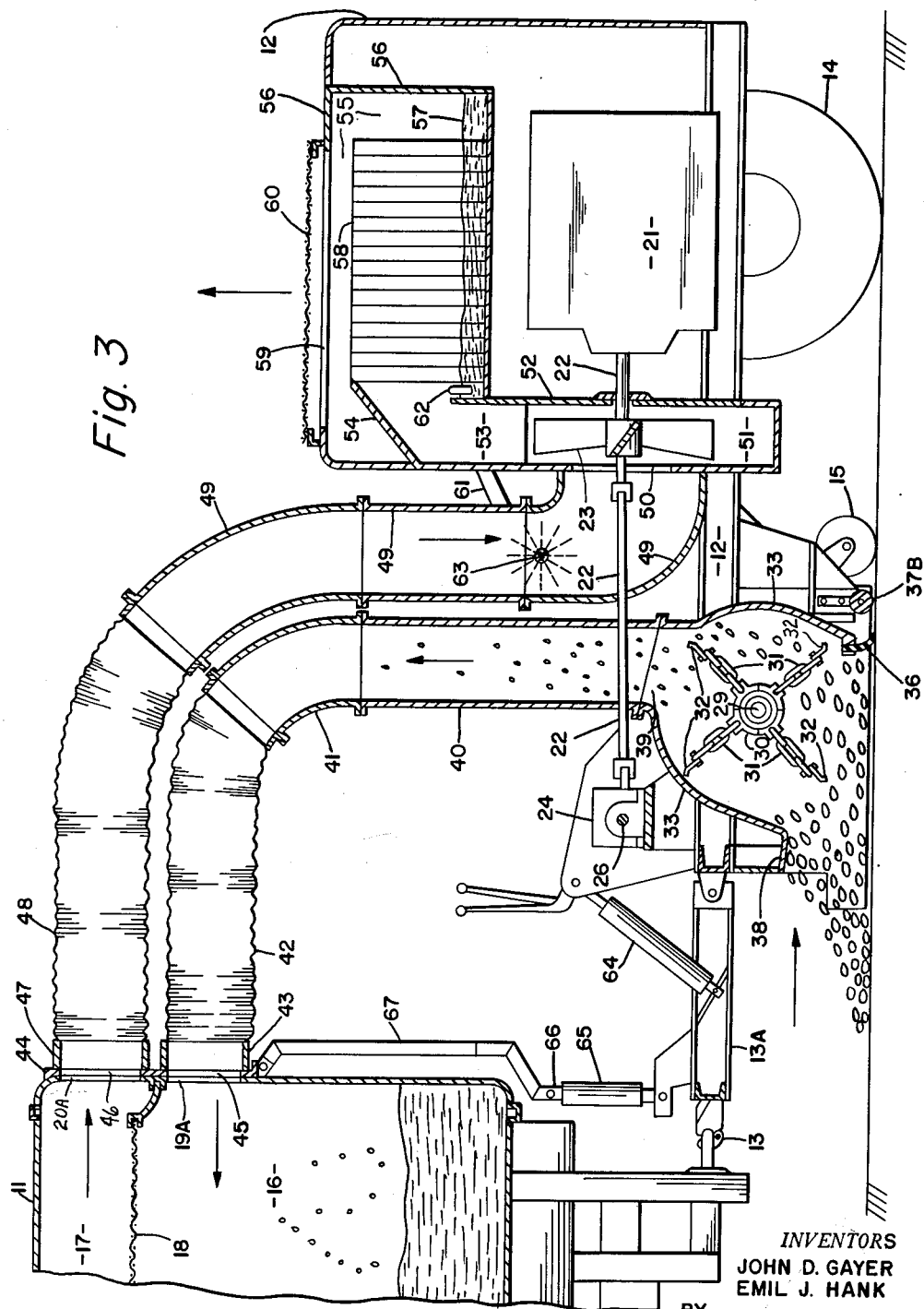
FIGURE 3 is a sectional view taken in the direction of arrows 3—3 in FIGURE 2.

The rotation of chains 31 and knife blades 32 is counterclockwise as viewed in FIGURE 3.

Truck 10 is then started and moved forward to draw the mulcher over the leaves. As knife blades 32 rotate, they engage with the packed leaves cutting them into small pieces. Some of the cut pieces of leaves are carried by knife blades 32 and are thrown up through opening 39 into housing 40. The other cut pieces are stirred up and are moved by the air flow up through opening 39 into housing 40. It is to be noted that in the mulcher, the air flow due to the partial vacuum is assisted by the rotary action to chains 31 and knife blades 32.

When knife blades 32 engage with the leaves, they are agitated so any dirt, stones or other debris on them will fall through to the ground.

Further, as knife blades 2 engage the leaves, they are initially compressed downward. After knife blade 32 passes over the compressed leaves beneath its reach, the leaves spring up due to their resiliency and are caught by the next knife blade 32. This and the agitating action stirs up all of the leaves, even those on the street surface, so they are moved by the air flow through opening 39 into housing 40. While the leaves are being moved by the air flow, most of them come in contact with part of chain 31 or a knife blade 32 to become shredded or cut. Thus, almost all of the leaves being picked up are shredded and cut.

It is to be noted that squeegee 36 prevents air from being drawn in under the rear of housing 33 and thereby disrupting the desired air flow path. Yet, it is flexible enough to allow the large and heavy objects not picked up to pass out from under the mulcher as it moves forward.

The above described action is more apparent when it is understood that knife blades 32 rotate at a rate of 960 revolutions per minute while the maximum speed at which truck 10 can tow the mulcher is 10 miles per hour.

It is understood that the speed at which truck 10 is allow to move forward is dependent upon the amount of the accumulation of leaves and their condition. That is, whether they are wet or dry and the degree to which they are packed.

Should the mulcher run into a large pile of leaves, it will not become clogged as prior systems would. Truck 10 is merely stopped and the mulcher will chew up the leaves until they are all loaded in the normal manner into chamber 16.

Also, it should be pointed out that the leaves are picked up immediately after the wheels of truck 10 have passed over them. This is contrary to the procedure used by prior systems since they had no automatic method of agitating the leaves.

Once the leaves are in housing 40, they are moved by the air flow through elbow 41, flexible hose 42, connection means 43, opening 45 and opening 19A into chamber 16. Because of the velocity of the air flow, the mulched leaves are thrown forward to the front of chamber 16.

It is important that fan 23 produce a flow of air in housing 40 sufficient to immediately move all of the mulched leaves thrown there by the mulcher. If this were not true, the mulched leaves would accumulate in housing 40 until it was completely clogged.

Screen 18 will remove any large particles of leaves or debris from the air flow moving from chamber 16 to chamber 17. However, it does not remove the dust and dirt suspended in the air. The dirt laden air will flow outward from chamber 17 through opening 20A, opening 46, connection means 47, flexible hose 48 to chamber 49. Here, water is drawn into the air stream by the partial vacuum from tank 57 through pipe 61. As it passes through fan 23, the water and dirt laden air completely mixed, with the particles of dirt adhering to the particles of water.

The water and dirt laden air moves upward through opening 53 where it is deflected by plate 54 into baffles 58. As the air flows through baffles 58, the particles of dirt and water adhere to the sides of baffles 58, while the air continues its movement outward through screen 60 to the atmosphere. The dirt and water then runs down the side of baffles 58 and drips into tank 57. The principle of mixing the water with the air and the details therefor and the removing of the moisture from the air stream is better described in U.S. Patent No. 3,036,326.

To facilitate the connection of trailer 12 to truck 10, tongue 13A is hingedly attached to trailer 12 and has a double acting piston 64 connected between it and the frame of trailer 12. By means of piston 64, tongue 13A and hitch 13 can be raised or lowered to the proper height for connection to truck 10.

Also, since piston 64 is double acting, it can raise the front of trailer 12 so casters 15 will rise off the ground when tongue 13A is connected to truck 10. Trailer 12 then can be readily transported at a fast rate of speed to a new position or to and from its garage.

During normal operation of the leaf collector, piston 64 is left free so the lowering of truck 10 due to its being loaded, will not change the height of trailer 12 and the distance of the mulcher from the surface of the street.

Again, to facilitate connection of trailer 12 to truck 10, a piston 65 is swively connected at one end to the front of tongue 13A. The ram 66 of piston 65 is connected by a shaft 67 to the bottom of connection plate 44. Thus, connection plate 44 may be raised until it can be inserted into the V-shaped wedge connection means on truck 10. This feature is desired due to the weight of hoses 42 and 48 and connection plate 44.

Figure 2:
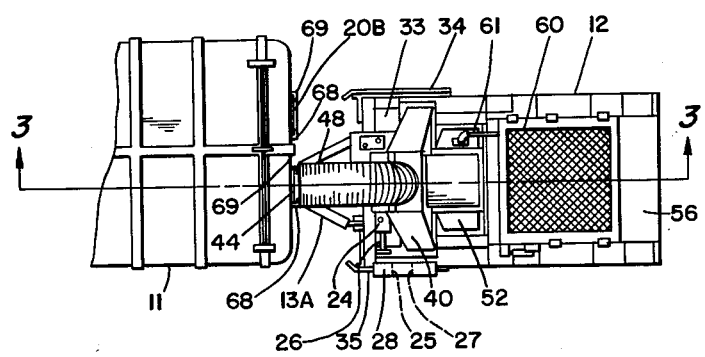
FIGURE 2 is a top view of the truck and trailer.
Figure 4:
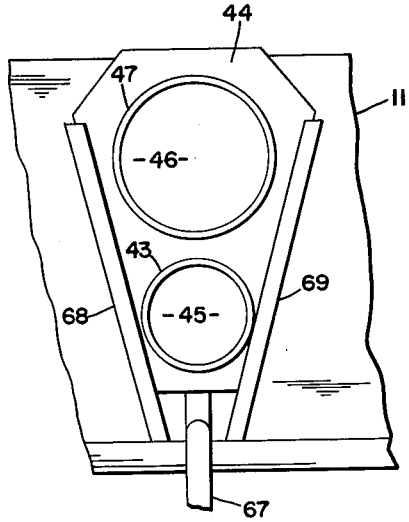
FIGURE 4 is a view of the means of connecting the hose to the truck.

The V-shaped wedge connection is best shown in FIGURES 2 and 4. L-shaped brackets 68 and 69 are welded on each side of openings 19A and 20A in the form of a V. Connection plate 44 is raised by piston 65 until it can slip inside the V. It is then lowered until tight, at which point, openings 45 and 46 in connection plate 44 are aligned with openings 19A and 20A or 19B and 20B, respectively.

Pistons 64 and 65 are hydraulically operated from a pump (not shown) that is driven by motor 21.

Thus, when a truck is full, it can be rapidly disconnected by unfastening hitch 13 and operating piston 62 until connection plate 44 is free of brackets 68 and 69. The truck may be driven away and an empty truck backed up to the trailer for connection.

Piston 64 is operated until tongue 13A and hitch 13 are at the proper height. The empty truck can back into engagement with hitch 13. Connection plate 44 is then manually swung by shaft 64 until over brackets 68 and 69. Piston 65 is lowered and connection plate 44 moves down until it engages brackets 68 and 69. The new empty truck 10 is connected to trailer 12 and ready for operation.

It is to be noted that because of the partial vacuum in chambers 16 and 17, connection plate 44 will be drawn closed to housing 11 to form a very tight and secure connection.

Our invention is not limited to the exact details illustarted and described, but is comprehensive of all changes and modifications thereof that may be made by those skilled in the art and which comes within the scope of the following claims.

We claim:

1. A system for collecting leaves from a street comprising; a truck having an enclosed housing thereon; a trailer connectable to be propelled by the truck; a fan on the trailer and connectable to the housing for creating a partial vacuum therein when the fan is operating; mulching means on the trailer and having a rotary shaft with shredding means flexibly depending therefrom, said shredding means spaced along the shaft length and around its circumference; means for communicating said partial vacuum from the housing to said mulching means; power means on the trailer for operating the fan and the mulching means, whereby when the power means is operating the mulching means shreds the leaves while picking them off the street and moving them so they are drawn into the housing by the partial vacuum.

2. A system for collecting leaves from a street comprising; a truck having an enclosed housing thereon; a trailer connectable to be propelled by the truck; a fan on the trailer and connectable to the housing for creating a partial vacuum therein when the fan is operating; dust arresting means on the trailer connected to remove the dust from the exhaust of the fan; mulching means on the trailer having a rotary shaft with shredding means flexibly depending therefrom, said shredding means spaced along the shaft length and around its circumference; means for communicating said partial vacuum from the housing to said mulching means; power means on the trailer for operating the fan and the mulching means, whereby when said power means is operating the mulching means shreds the leaves while picking them off ithe street so they are drawn by the partial vacuum into the housing and the exhaust air is passed through the dust arresting means to remove the dust therefrom.

3. A system for collecting leaves from a street comprising; a truck having an enclosed housing thereon; a trailer connectable to be propelled by the truck; a fan on the trailer for producing an air flow when operating; a first hose communicating air flow from the housing to the fan; a mulcher having a rotary shaft with shredding means flexibly depending therefrom spaced along its length and around its circumference for shredding the leaves while picking them off the street when operating; a second hose communicating air flow from the mulcher to the housing; power means for operating the fan and the mulcher concurrently, whereby when said power means is operating the mulcher shreds the leaves while picking them off the street and the air flow deposits them in the housing.

4. A system for collecting leaves from a street comprising; a truck having an enclosed housing thereon; a trailer connectable to be propelled by the truck; a fan on the trailer for producing an air flow when operating; a first hose communicating air flow from the housing to the fan; baffles disposed in the exhaust air flow path from the fan; a tank having water therein located under the baffles; pipe means for communicating water into the first hose when air is flowing; a mulcher having a rotary shaft with shredding means flexibly depending therefrom spaced along its length and around its circumference for shredding and picking up the leaves when operating; a second hose communicating air flow from the mulcher to the housing; power means for operating the fan and mulcher concurrently whereby the mulcher shreds the leaves while picking them up and the air flow deposits them in the housing; and the air flow in the first hose draws water through the pipe means so it is mixed by the fan to adhere to dirt particles entrained in the air and when exhausted, the dirt and water are deposited on the baffles and the clean air exhausted.

5. A system for collecting leaves from a street comprising; a truck having an enclosed housing thereon; a trailer having a fan, a mulcher and a power means thereon; said mulcher having a rotary shaft with shredding means flexibly depending therefrom and spaced apart along its length and around its circumference; a first hose for communicating air flow from the housing to the fan; a second hose for communicating air flow from the mulcher to the housing; hitch means for connecting the trailer to the truck for movement therewith; connection means for connecting the first and second hose to the housing; the power means connected to operate the mulcher and fan concurrently, whereby when the power means is operating the mulcher shreds the leaves while picking them off the street and the air flow created by the fan moves the leaves from the mulcher through the second hose into the housing.

6. A system for collecting leaves from a street comprising; a truck having thereon an enclosed housing divided into a first and second chamber; a trailer having thereon a fan, a mulcher and a power means, the power means connected to operate the fan and mulcher concurrently; said mulcher having a rotary shaft with shredding means flexibly depending therefrom and spaced apart along its length and around its circumference; a first hose for communicating air flow from the first chamber to the fan; a second hose for communicating air flow from the mulcher to the second chamber; a hitch for connecting the trailer to the truck for movement therewith; connection means for connecting the first and second hose to the first and second chamber respectively whereby when the power means is operating the mulcher shreds the leaves while picking them off the street and the air flow created by the fan moves the leaves from the mulcher through the second hose into the second chamber and upon operation of the hitch and the connection means the trailer is disconnected from the truck and the first and second hose is disconnected from the first and second chamber.

7. A system for collecting leaves from a street comprising; a truck having an enclosed housing thereon; a trailer having thereon a fan, a mulcher, a dust arrester and a power means; the power means connected to operate the fan and mulcher concurrently; said mulcher having a rotary shaft with shredding means flexibly depending therefrom and spaced apart along its length and around its circumference; a first hose for communicating air flow from the housing to the fan; a second hose for communicating air flow from the mulcher to the housing; the dust arrester disposed in the exhaust of the fan and having baffles suspended over a tank of water, pipe means for communicating water from the tank to the first hose; a hitch for connecting the trailer to the truck for movement therewith; connection means for connecting the first and second hose to the housing, whereby when the power means is operating the mulcher shreds the leaves while picking them off the street and the air flow created by the fan moves the leaves from the mulcher through the second hose into the housing and the housing is exhausted by air flow through the first hose to the fan where it is mixed with water from the pipe means and the fan exhausts the mixed air through the baffles which removes the water and dirt.

8. A system for collecting leaves from a street comprising; a truck having an enclosed housing thereon; a trailer having collecting means for picking the leaves from the street; hoses for communicating the leaves from the collecting means to the housing; a hitch hingedly connected to the trailer and for connecting the trailer to and disconnecting the trailer from the truck for movement therewith; a double acting piston connecting the hitch to the trailer for providing relative movement therebetween; connection means for connecting the hoses to the housing having a piston swively mounted on the hitch for raising and engaging the connection means; whereby the truck and the trailer may be readily connected or disconnected.

9. A system for collecting leaves from a street comprising; a truck having an enclosed housing thereon; a trailer having thereon a fan, a mulcher and a power means, the power means connected to operate the fan and mulcher concurrently, the mulcher having a rotary drum with chains spaced along its length and around its circumference, a knife blade attached to the end of each chain; a first hose for communicating air flow from the housing to the fan; a second hose for communicating air flow from the mulcher to the housing; a hitch for connecting and disconnecting the trailer to and from the truck; connection means for connecting and disconnecting the first and second hose to and from the housing; whereby when the power means is operating the chains and knife blades will be rotated to shred and pick up the leaves and the air flow created by the fan moves the leaves from the mulcher through the second hose into the housing.

10. A system for collecting leaves from a street comprising; a truck having an enclosed housing thereon divided into a first and second chamber; a trailer having thereon a fan, a mulcher, and a power means; the power means connected to operate the fan and mulcher concurrently; the fan having a housing with an intake and an exhaust opening; an elongated open bottom housing for the mulcher having therein a rotatable drum with depending chains spaced along its length and around its circumference, a knife blade attached to the end of each chain; a first hose for communicating air flow from the first chamber of the housing to the intake of the fan; a second hose for communicating air flow from inside the mulcher housing to the second chamber; a hitch for connecting and disconnecting the trailer to and from the truck; connection means for connecting the first and second hose to and from the first and second chamber respectively; whereby when the trailer and connection means are connected and the power means operating, the chains and knives will rotate to shred and pick up the leaves and the air flow created by the fan moves the leaves from the mulcher housing through the second hose into the second chamber.

(References on following page)

References Cited in the file of this patent

UNITED STATES PATENTS

| | | |
|---|---|---|
| 514,677 | Furnas | Feb. 13, 1894 |
| 514,678 | Furnas | Feb. 13, 1894 |
| 1,534,233 | Lundy | Apr. 21, 1925 |
| 2,481,652 | Fort | Sept. 13, 1949 |
| 2,505,576 | Reitan | Apr. 25, 1950 |
| 2,556,446 | Roach | June 12, 1951 |
| 2,663,894 | Elliotte | Dec. 29, 1953 |
| 2,678,462 | Lison et al. | May 18, 1954 |
| 2,990,019 | Finn | June 27, 1961 |

FOREIGN PATENTS

| | | |
|---|---|---|
| 486,505 | Great Britain | June 2, 1938 |